(12) United States Patent
Bernhardt et al.

(10) Patent No.: US 9,000,387 B2
(45) Date of Patent: Apr. 7, 2015

(54) RADIATION DETECTOR, IN PARTICULAR X-RAY RADIATION DETECTOR

(75) Inventors: Philipp Bernhardt, Forchheim (DE); Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 523 days.

(21) Appl. No.: 13/408,406

(22) Filed: Feb. 29, 2012

(65) Prior Publication Data

US 2012/0223239 A1   Sep. 6, 2012

(30) Foreign Application Priority Data

Mar. 1, 2011 (DE) .......................... 10 2011 004 918

(51) Int. Cl.
  *G21K 4/00* (2006.01)
  *G01T 1/20* (2006.01)
(52) U.S. Cl.
  CPC ................ *G21K 4/00* (2013.01); *G01T 1/2018* (2013.01)
(58) Field of Classification Search
  CPC ........ G01T 1/1642; G01T 1/1644; G01T 1/20
  USPC .................................................... 250/370.11
  See application file for complete search history.

(56) References Cited

U.S. PATENT DOCUMENTS

| 4,947,046 A | 8/1990 | Kawabata et al. .......... 250/484.1 |
| 7,635,848 B2 * | 12/2009 | Nelson ...................... 250/370.11 |
| 7,692,156 B1 | 4/2010 | Nagarkar ................. 250/370.11 |
| 2004/0126489 A1 | 7/2004 | Fuchs et al. ................ 427/248.1 |
| 2006/0108533 A1 * | 5/2006 | McEvoy et al. ............... 250/367 |
| 2013/0134316 A1 * | 5/2013 | Nakatsugawa et al. ....... 250/366 |

FOREIGN PATENT DOCUMENTS

| DE | 10242006 A1 | 3/2004 | ............... G21K 4/00 |
| JP | 2009236704 A | 10/2009 | ................ G01T 1/20 |

OTHER PUBLICATIONS

Spahn, Martin; "Flat Detectors and Their Clinical Applications", Physics, vol. 15, pp. 1934-1947, Apr. 2, 2005.
German Office Action, German Patent Application No. 10 2011 004 918.5, 5 pages, Feb. 8, 2012.

* cited by examiner

*Primary Examiner* — Casey Bryant
(74) *Attorney, Agent, or Firm* — King & Spalding L.L.P.

(57) ABSTRACT

A radiation detector, in particular an X-ray radiation detector, in the form of a flat-panel detector, may comprise a scintillator layer applied to a substrate and comprising elongated needles made from a scintillator material forming the scintillator layer, and an actively readable pixel array composed of photodiodes, wherein the thickness of the scintillator layer may be in the range of 900 μm-2500 μm, and wherein the angle at which the needles stand relative to the pixel array, starting from 90° in the center of the detector, may decrease with increasing distance from the center of the detector.

15 Claims, 4 Drawing Sheets

RADIATION DETECTOR, IN PARTICULAR X-RAY RADIATION DETECTOR

CROSS-REFERENCE TO RELATED APPLICATIONS

This application claims priority to DE Patent Application No. 10 2011 004 918.5 filed Mar. 1, 2011. The contents of which is incorporated herein by reference in its entirety.

TECHNICAL FIELD

This disclosure relates to a radiation detector, e.g., an X-ray radiation detector, which may take the form of a flat-panel detector comprising a scintillator layer applied to a substrate and comprising elongated needles made from a scintillator material forming the scintillator layer, and an active readout pixel array composed of photodiodes.

BACKGROUND

Radiation-based imaging systems, mainly X-ray systems, are routinely used for diagnostic examination purposes prior to interventional procedures e.g. in cardiology, radiology and surgery. Such systems generally consist of a C-arm on which are mounted a radiation source and a radiation detector, i.e. an X-ray tube assembly and an X-ray detector for example, a high-voltage generator for generating the tube voltage, an imaging system including monitor, a control device and a patient positioning table. Systems having two C-arms that are movable in separate planes are also known.

These days flat-panel detectors are typically used as X-ray radiation detectors. Normally such flat-panel detectors are indirect-converting detectors in which the incident radiation that has penetrated the examination object is not converted directly into electrical signals, but is initially converted into light, which is then converted into electrical signals. Detectors of said type therefore comprise a scintillator layer consisting of elongated needles made from a scintillator material forming said scintillator layer. Said scintillator layer is applied on a substrate. Photooptically coupled to the scintillator layer is an active readout pixel array consisting of a multiplicity of photodiodes arranged in a matrix shape, each photodiode being associated with one pixel. Each pixel also includes a switching element, typically in the form of a transistor, the individual pixels obviously being provided also with corresponding drive and readout electronics. This pixel and readout array can be implemented on the basis of CMOS or related technologies, while detectors having active photodiode and readout arrays composed of polycrystalline silicon are also known.

The scintillator layer can consist for example of CsJ, which creates the scintillator layer in the form of tightly packed needles that have been grown on the substrate. Other scintillator materials, such as $Gd_2S_2O$, CuJ, CsF, $BaF_2$, $CeF_3$, BGO for example, are also known and structured in similar fashion.

During operation the X-rays, after having penetrated the object, strike the scintillator layer and, depending on the hardness of the radiation, i.e., the radiation intensity, are absorbed in different planes in the scintillator layer and converted into light, which is to say that the incident X-ray quanta are converted into light quanta. Said light quanta are guided by way of the scintillator needles to the optically coupled pixel array located there under, where they are incident on the individual photodiodes. There, the light quanta are converted into electrical signals, which are then read out.

The basic structure and the basic principle of operation of such a radiation detector are sufficiently well-known.

The quantum efficiency of a scintillator varies depending on radiation quality, e.g., between roughly 50%-80%, dependent on radiation quality, in the case of a scintillator made of CsJ having a layer thickness of, e.g., 600 µm. As a result the spatial frequency-dependent detective quantum efficiency DQE(f) (DQE=Detective Quantum Efficiency) is limited at the upper end and is even significantly below this for typical pixel sizes of, e.g., 150-200 µm and for the applications of relevant spatial frequencies of 1-2 lp/mm. Above the K-edge it basically holds that the absorption decreases with increasing radiation hardness, and as a consequence thereof so too does the DQE(f).

Harder radiation occurs very frequently in interventional cardiology applications, for example. The treatment of corpulent patients may be cited as an example, as also may the recording of oblique projections, a penetration of the patient of up to 40 cm and more being necessary in both cases, which is to say that the X-ray quanta travel a correspondingly long way, namely up to 40 cm and more, through the patient. Due to the decreasing DQE(f) it is not always possible in this case to deliver images of acceptable quality, while the X-ray dose requiring to be applied is also considerable.

SUMMARY

In one embodiment, a radiation detector, in particular an X-ray radiation detector, in the form of a flat-panel detector, may comprise a scintillator layer applied to a substrate and comprising elongated needles made from a scintillator material forming the scintillator layer, and an actively readable pixel array composed of photodiodes, wherein the thickness of the scintillator layer is in the range of 900 µm-2500 µm, wherein the angle at which the needles stand relative to the pixel array, starting from 90° in the center of the detector, decreases with increasing distance from the center of the detector.

In a further embodiment, the thickness of the scintillator layer is in the range of 1000 µm-2000 µm. In a further embodiment, the needles are arranged at an angle which becomes progressively smaller. In a further embodiment, at the surface carrying the scintillator layer the substrate is structured so as to define the respective local angle. In a further embodiment, the structuring is realized in the form of surface sections. In a further embodiment, the surface sections are in the shape of honeycombs, tetragons, polygons or circles. In a further embodiment, tetragonal surface sections are arranged on a circular path, wherein the surface is structured with a plurality of concentric circular paths. In a further embodiment, adjacent surface sections are separated from one another by way of ridges projecting in the direction of the needles. In a further embodiment, the size of a surface section essentially corresponds to the cross-sectional area of a deposited needle. In a further embodiment, the substrate is a foil, in particular a metal foil. In a further embodiment, the metal foil is an aluminum foil.

BRIEF DESCRIPTION OF THE DRAWINGS

Example embodiments will be explained in more detail below with reference to figures, in which.

DETAILED DESCRIPTION

Figure 1:
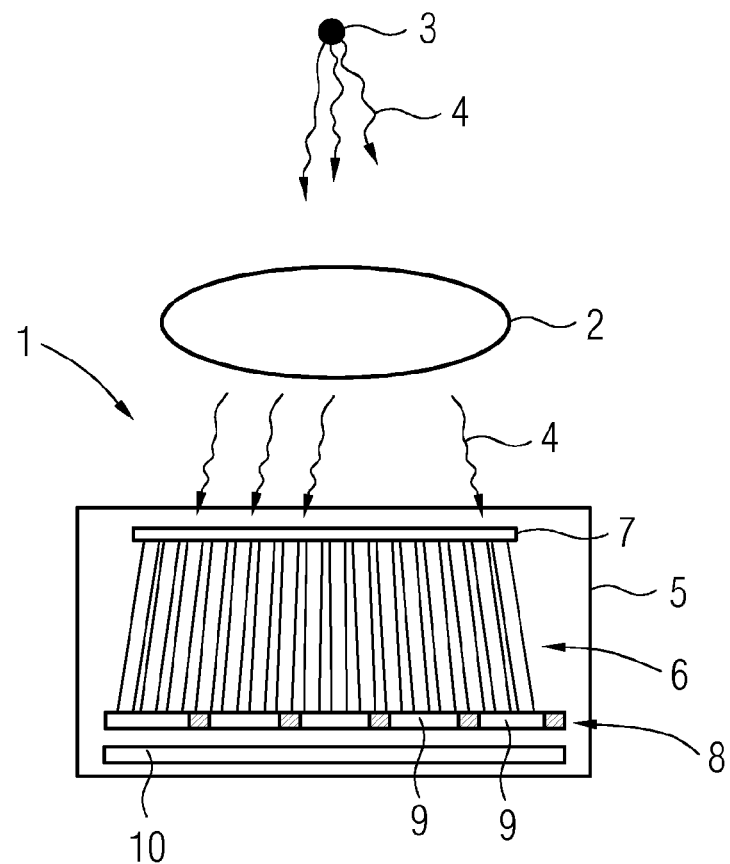
FIG. 1 is a schematic representation of a radiation detector together with associated radiation source, according to certain embodiments.

Some embodiments relate to a radiation detector which, in addition to its fundamental suitability for recording images when soft radiation is applied, may be suitable for recording X-ray images with harder radiation while at the same time providing a high DQE(f).

Thus, some embodiments provide a radiation detector in which the thickness of the scintillator layer is in the range 900 μm-2500 μm, and wherein the angle at which the needles stand relative to the pixel array, starting from 90° in the center of the detector, decreases with increasing distance from the center of the detector.

In some embodiment, the radiation detector may employ a scintillator layer having a significantly increased thickness. Whereas conventional scintillator layers are typically in the range of 400-700 μm thick, certain embodiments provide a scintillator layer between 900 μm e.g., up to and 2500 μm thick. In some embodiments, the layer thickness lies in the range between 1000 μm and 2000 μm. Further, all intermediate values lying in the interval from 900 μm to 2500 μm, as appropriate for particular embodiments, should be considered as being disclosed. For example, intervals with lower bounds of 950 μm, 1100 μm, 1200 μm, etc. and upper bounds of 2200 μm, 1900 μm, 1800 μm, etc., are herewith considered as being disclosed.

Referred to the direction of incidence of the X-ray quanta, the use of a scintillator layer with the specified thickness may constitute a significantly great "conversion depth", which is to say that hard radiation which penetrates relatively deeply into the scintillator layer can also be absorbed there, while soft radiation, which is absorbed closer to the surface, can, of course, also be correspondingly converted. The result of this is that in comparison with certain conventional radiation detectors the DQE(f) likewise increases during application of harder radiation owing to the increased absorption. This basically applies to many or all known scintillator materials, especially CsJ, or scintillators doped with Tl or with Na, such as CsJ:Tl or CsJ:Na, but also to other scintillator materials that are capable of being structured, as cited in the introduction.

Further, in some embodiments, the angle at which the elongated needles stand relative to the plane of the pixel array varies across the surface area of the detector. At the center of the detector the needles still stand vertically on the pixel array plane. As the distance from the center increases, the needle angle changes, the needles being tilted toward the center of the detector, while the angle to the edge of the detector steadily increases. The configuration in terms of the angular progression is chosen here such that the needles are aligned onto a common focus in which the X-ray radiation source is preferably arranged in the image recording situation, e.g., such that all converge toward a common point. The needles are aligned both in the x- and in the y-direction, thereby producing an increasingly pronounced cone-shaped structure starting from the center of the detector.

By virtue of such needle orientation, parallax effects which lead to a deterioration in spatial resolution, i.e., in the modulation transfer function MTF, may advantageously be avoided or reduced. Such parallax effects occur when the X-ray quanta do not impinge vertically on the detector or scintillator surface. Depending on the absorption site it can then happen that two X-ray quanta absorbed at different depths in the scintillator layer, or the light quanta converted there, are mapped into one and the same pixel, even though the X-ray quanta are actually incident at different angles. This parallax phenomenon is negligible in the case of certain conventional radiation detectors having relatively thin scintillator layers and the soft radiation that is normally used, or can be corrected using image processing techniques. With the scintillator thickness provided herein, however, said parallax effects may be extremely significant, in particular as the incidence sites get closer and closer to the edge of the detector. Consequently it may be necessary here to look for a way by which such effects can be at least attenuated, if not even avoided to a large extent. It is for this reason that the angled orientation of the needles is proposed, which may provide a remedy in this case. This is because as a result of being focused on the location of the X-ray radiation source the needles stand in the linear direction or extension of the emitted X-ray quanta, consequently also of the X-ray quanta, which penetrate the X-ray examination object unscattered. As a result the X-ray quanta can penetrate the individual needles virtually in an ideal manner, are reflected and absorbed there, in the same way as the generated light quanta are, of course, also guided in the respective needle through reflection and impinge on the associated pixel.

The extent of the parallax effect is essentially determined by four fringe variables, namely firstly the distance between radiation source and radiation detector, usually referred to as SID (SID=Source-to-Imager Distance), secondly the size of the detector, thirdly the scintillator thickness, and finally the pixel size.

Typical distances between X-ray radiation source and radiation detector, in the case of C-arm systems for example, lie in the range of 90 cm-120 cm, though greater distances occur in radiography. With smaller distances the parallax problem becomes even more critical. It may be beneficial, for example, to optimize the needle alignment to an average SID value of, for example, 105 cm, which may represent a good compromise, even if the actual SID value then amounts to, for example, 90 cm or 120 cm.

The detector size typically ranges from 20×20 cm$^2$ to approximately 40×40 cm$^2$. Of course, the greater the size of the detector, the greater is the angle of inclination of the edge-side needles at the same SID value.

As described, in some embodiments, the scintillator thickness is preferably in the range of 1000-2500 μm.

In some embodiments, he pixel size lies in the region of approx. 150 μm.

At an assumed example SID value of 100 cm, an example pixel size of 150 μm, and an example scintillator thickness of 1500 μm, a deterioration in spatial resolution, i.e., the MTF, is to be expected in the limit case of the absorption of quanta at the top edge of the scintillator or at the bottom edge of the scintillator already at a radial distance $r=\sqrt{x^2+y^2}$ from the center of the detector of approximately 10 cm. For a large detector with a surface area of 40×40 cm$^2$, a significant deterioration in spatial resolution would therefore result without the disclosed needle tilting in the edge zones.

Allowance is now made for this by means of the particular angled arrangement of the needles and their focusing on a common point. In some embodiments the selected scintillator layer thickness and angular inclination of the needles may result in a significant increase in the DQE(f), which in the ideal case may approach almost around 100%, while the spatial resolution, i.e., the MTF, may be excellent over the entire surface area of the detector.

In some embodiments, the needles can be arranged at an angle which becomes progressively smaller. That is to say that as the distance from the center increases the individual needles are inclined at a steadily decreasing angle, albeit an angle changing only slightly each time. A factor to potentially be taken into account here is, of course, the manufacturing techniques applied in the process of fabricating the scintillator layer, which is produced by vapor deposition of the scintillator material onto the substrate and subsequent cooling, in the course of which cooling process the more or less cohesive scintillator layer immediately after the vapor deposition fractures due to the cooling-down process and the stresses consequent thereon, as a result of which the individual needles form. Basically it holds that the aim is to allow the angle of inclination to vary in as finely resolved a manner as possible. In any event, however, the result is the variation in angle and focusing on the common orientation point over the entire surface area of the scintillator as provided by embodiments disclosed herein.

In order to enable the angled orientation of the needles a particularly beneficial development of certain embodiments provides that the substrate is structured at the surface carrying the scintillator layer so as to define the respective local angle. Said structuring may be preferably realized in the form of surface sections. As described, the substrate surface may be coated with the scintillator material by vapor deposition, i.e., said material may be deposited thereon. The structuring, in particular the surface sections embodied there, may be formed by the seed crystals which provoke the crystallization of the vapor-deposited scintillator material, said crystals ultimately predefining the crystallization and growth direction for the vapor-deposited scintillator material. During the subsequent cooling the scintillator layer fractures, as described, with the rupture lines preferably running at right angles to the surface sections so that the respective needle is produced with the angular arrangement dependent on the orientation of the respective surface section.

The surface sections can have different shapes, a honeycomb shape being preferred, said honeycomb-shaped surface sections being able to form as structuring with a particularly tight packing density. However, tetragons or polygons or circles, etc. are also conceivable.

If tetragonal surface sections, for example, are used as structuring sections, these can be arranged on a circular path, the surface being structured with a plurality of concentric circular paths. That is to say that the surface sections each defining the same angle lie on the same radius around the center of the substrate in each case, resulting in the formation of concentric circles or rings.

In some embodiments, adjacent surface sections are separated from one another by way of ridges projecting in the direction of the needles. The surface sections are thus delimited by way of said ridges, although it is not necessary in the case of the formation of honeycomb structures, for example, for each surface section to be bordered completely in this way. It is also possible for corresponding ridges to be provided only at parts of the surface edges. Said ridges, which are beneficial in particular in the case of the above-described embodiment variant having the tetragonal surface sections on the corresponding circular or annular paths in order to separate the individual surface sections from one another on the respective circular or annular path, produce a defined splintering of the scintillator layer into the needles down to the needle butt.

The size of a surface section essentially corresponds to the cross-sectional area of a deposited needle. In other words, each surface section ultimately carries only one needle, said size correspondence relating to the needle butt, since in some cases the needles can taper somewhat toward the top.

In some embodiments, the structured substrate is preferably a foil, in particular a metal foil, which can be structured in a simple manner, at least on the surface carrying the scintillator layer, by means of an appropriate printing or pressing method. For this purpose use is made for example of a corresponding printing or extruding die which carries the structuring which is to be mapped and which is then transferred onto the foil during the extrusion process. An aluminum foil may be particularly suitable as a metal foil, though other types of foil are not excluded.

Of course it is possible also to planarize the applied scintillator layer following the deposition process by means of a polishing process, as also, of course, to coat the finished radiation detector by applying appropriate protective or adhesive layers that may be necessary in order to encapsulate the scintillator material, i.e., for example CsJ, or to couple it to the active photodiode and readout array.

FIG. 1 shows in the form of a schematic diagram a radiation detector 1 according to certain embodiments, which may be used, for example, for recording fluoroscopic X-ray images through an object 2. The fluoroscopic X-ray images may be recorded using a radiation source 3, an X-ray source for example, which in this case emits X-ray quanta 4. These pass through the object 2, where they are attenuated according to the substance passed through (bone, tissue, etc.), and after passing through the object 2 reach the radiation detector 1. The latter may comprise, in addition to a housing 5 encapsulating it, a scintillator layer 6 which is applied on a substrate 7. The scintillator layer 6 is bonded by way of an adhesive connection (not shown in further detail) to a planar pixel array 8 comprising a multiplicity of individual photodiodes 9 in a matrix-shaped arrangement. Associated with the pixel array 8 is a readout electronics circuit 10 via which the individual signals generated on the pixel side are read out.

Figure 2:
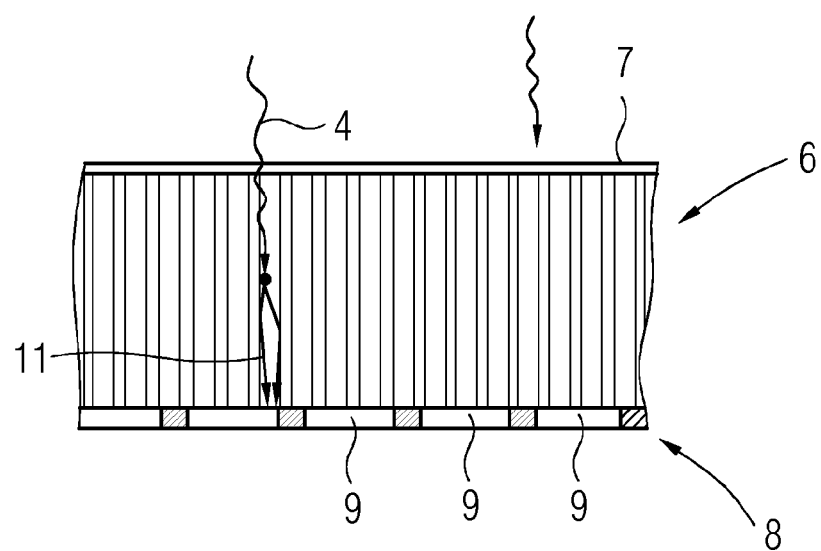
FIG. 2 is a magnified view serving to illustrate the conversion of the radiation in a scintillator.

These signals are generated (see FIG. 2) as a result of the X-ray quanta 4 incident on the scintillator layer 6, which of course pass through the substrate 7 unattenuated, being absorbed there and light quanta 11 being generated by means of the scintillator material, for example CsJ, at the absorption site. These light quanta are then guided by way of the needle-shaped scintillator material, which thus includes a multiplicity of individual needles disposed adjacent to one another, in the respective needles to the pixel array 8 and there to the respective photodiodes 9. Depending on the intensity of the impinging light quanta 11, the photodiodes 9 now generate a corresponding electrical signal which is initially stored there and read out pixel by pixel via the readout electronics circuit 10. For this purpose each pixel may include in addition to the photodiode 9 a drivable TFT transistor which serves as a switch, wherein the individual TFT transistors can be driven in a dedicated manner via the readout electronics circuit 10.

The basic structure and the basic principle of operation of such a radiation detector are well-known.

In some embodiments of the invention, radiation detector 1 may include a special scintillator layer 6. The scintillator layer may comprise (see the example schematic representation according to FIG. 3) a multiplicity of individual needles 12 which may be spaced apart at a minimal distance from one another, such that as a result interfaces are produced between the needle and the environment, which interface may be necessary because of the different refractive indices in order to be able to guide the X-ray quanta 4 on the one hand and the light quanta 11 on the other hand in the respective needle 12 and route them to the respective associated pixel 9. The average layer thickness of the scintillator layer 6 comprising the needles 12 may be between 900 µm and 2500 µm, preferably between 1000 µm and 2000 µm. It is therefore significantly greater compared with scintillator layer thicknesses of certain conventional systems. Furthermore, as shown in the example embodiment of FIG. 3, the individual needles 12 may be arranged in a non-parallel manner. For example, the scintillator layer 6 may be configured such that, starting from a vertical arrangement relative to the surface or plane of the pixel array 8, the needles 12 stand at an angle that decreases from the inside toward the outside as the distance from the center of the detector increases. In some embodiments, the angle may be chosen such that the needles converge toward a common point (see FIG. 4). This point may be the focus of the radiation source 3, that is to say that the needles are focused effectively in a cone shape on said point. As shown in the example embodiment of FIG. 4, the angle may decrease with increasing distance from the center of the detector, i.e. as the radius increases, the angle of inclination of course being given both in the x- and in the y-direction relative to the detector surface. The angle $\alpha$ relates to the smallest angle at which a needle 12 stands relative to the plane of the pixel array 8. The ideal angle $\alpha$ at which the needles are inclined can be specified for example for a given SID value (i.e. a given distance from the radiation source to the detector) of e.g. 105 cm as a function of the distance of the radius, and consequently of the distance of the respective point at which the respective needle 12 is attached to the substrate 7, from the center of the detector. Assuming a normal orientation of the detector surface with respect to the X-ray tube focus, the following ideal angles of inclination are yielded for example with an SID value of 105 cm:

r=10 cm: $\alpha$=83.69°
r=20 cm: $\alpha$=78.02°
r=25 cm: $\alpha$=75.12° where r is the radius. The value r=20 cm corresponds to the maximum possible distance of the needles 12 from the center of the detector surface for a detector surface area of 30×30 cm$^2$.

Because the needles are inclined both in the x- and in the y-direction, a given alignment of the needles 12 onto the tube focus may be produced over the entire surface area of the detector.

As a result of the substantial layer thickness of the scintillator layer 6, e.g., 900 µm or more, the DQE(f) value may be very high, being close to 100% given an ideal orientation of the needles. This means that also, and in particular in the case of hard X-ray radiation, the radiation detector as disclosed herein may have virtually 100% DQE(f) in the relevant spatial frequency range of 1-2 lp/mm. In other words, almost all of the incident X-ray beams may be actually converted.

Further, the angled inclination of the needles with increasing variation of the angle $\alpha$ toward the edge may provide that practically no parallax effects occur. Parallax effects come about due to the fact that, with obliquely incident X-ray quanta and different absorption planes within the scintillator layer 6, two X-ray quanta, viewed vertically relative to the pixel lying there under, are converted at the same point and consequently the image information of both X-ray quanta, which are actually incident at different angles, is mapped in the same pixel. This parallax effect is the greater closer to the edge the X-ray quanta impinge.

This parallax effect may now be minimized or reduced as a result of the angled alignment of the individual needles. The reason is that the needles 12 ultimately stand in longitudinal extension of the incident X-ray quanta, that is to say that the latter ideally strike the tip of the needle, thus penetrating the needle, are guided in the latter on account of the total reflection until the conversion into the light quanta takes place, said light quanta for their part again being guided in the needle until they impinge on the photodiode array 8 and are converted in the associated pixel.

Figure 3:
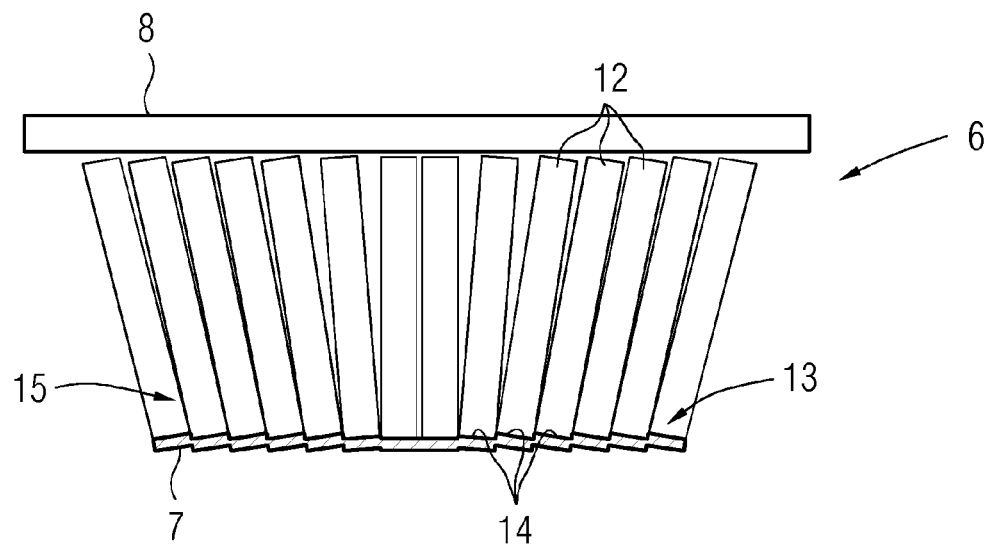
FIG. 3 is a schematic representation showing a sectional view through the scintillator layer together with substrate serving to illustrate the angled arrangement of the needles, according to certain embodiments.
Figure 4:
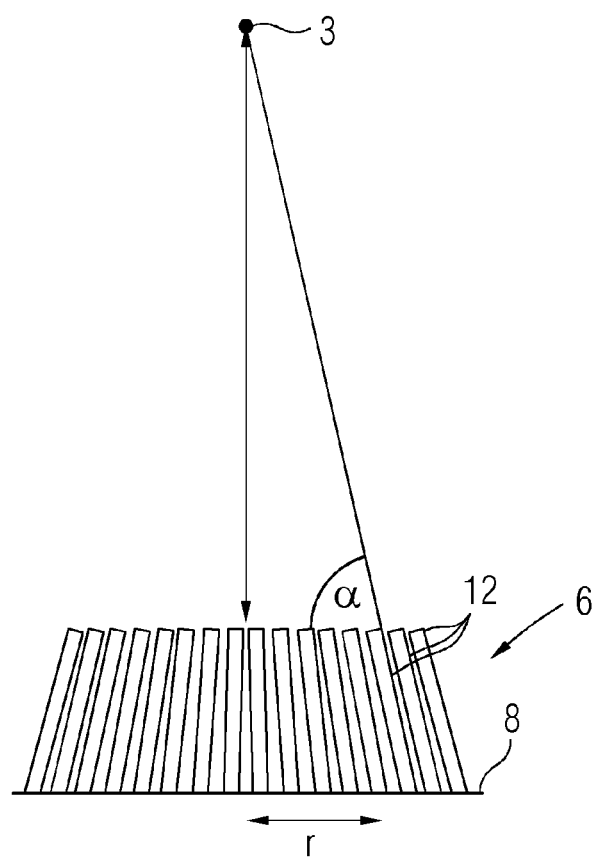
FIG. 4 is a schematic representation serving to explain the needle tilt angle, according to certain embodiments.

In order to be able to realize the angled arrangement of the needles discussed above, in some embodiments the substrate 7, which comprises for example a thin metal foil, made of aluminum for example, may be structured on its top side 13 (see FIG. 3). As can be seen, individual surface sections 14 may be formed whose surface area essentially corresponds to the cross-sectional area of a grown needle 12. These individual surface sections act as seed cells for the crystal growth of the vapor-deposited scintillator layer 6. During the vapor deposition a layer composed of the scintillator material employed, for example CsJ, is deposited on the surface 13 of the substrate 7, the layer becoming thicker and thicker as the vapor deposition time increases. As the layer cools down following the vapor deposition, internal stresses within the crystalline scintillator layer due to the cooling process cause the layer to fracture and lead to the formation of the individual needles. The surface sections 14 in each case aligned according to the desired, local angle of inclination of the individual needle act effectively as definition or reference surfaces for the rupture lines along which the layer fractures, with the result that the individual needles 12 are formed with the desired angle of inclination, as shown in the schematic diagram according to FIG. 3.

The structuring 15 of the surface 13 over the surface sections 14 can be formed on the foil surface by means of a printing or extrusion process for example. Honeycomb or tetragonal and polygonal shapes for example are conceivable as possible shapes for the surface sections 14.

Figure 5:
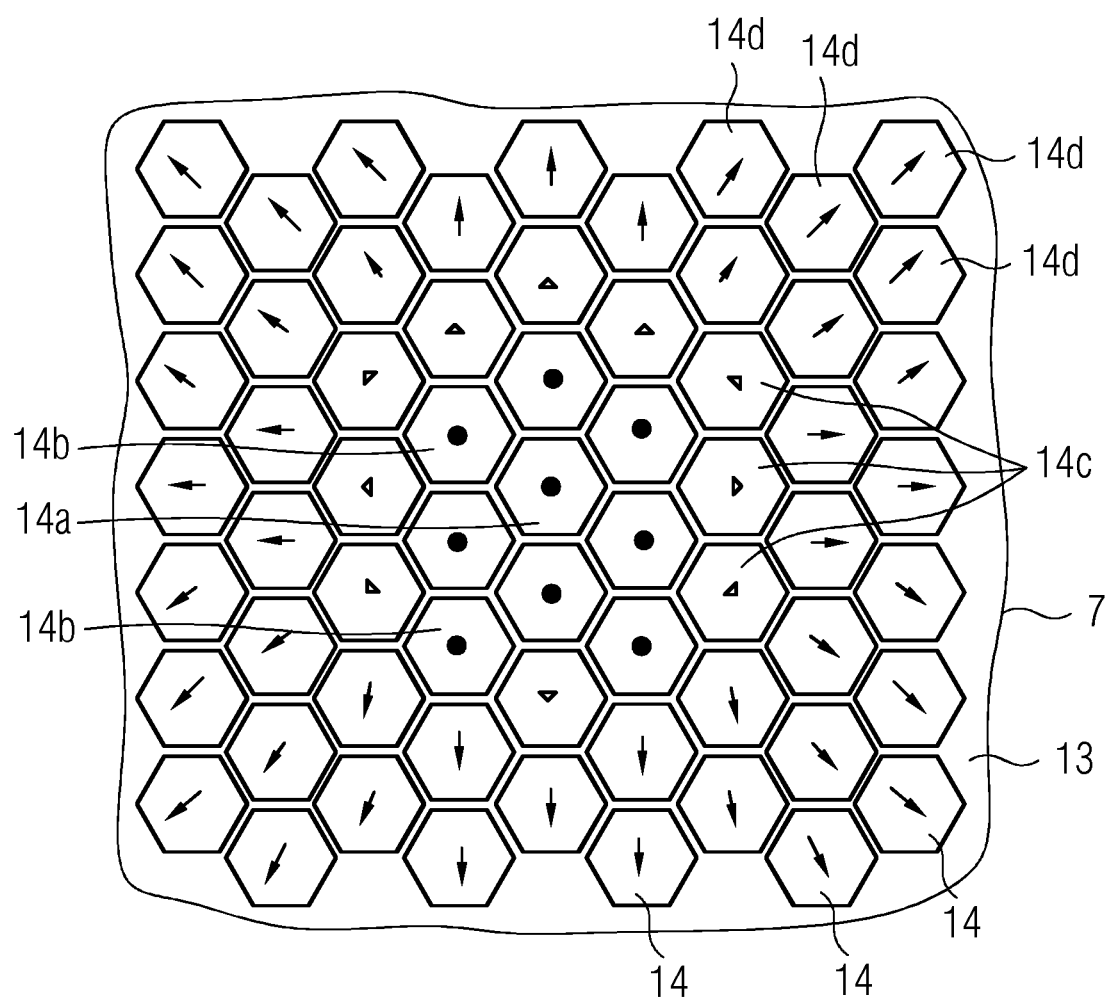
FIG. 5 shows a plan view onto the surface of a structured substrate of a first embodiment variant, according to certain embodiments.

An exemplary embodiment of a honeycomb shape is shown in FIG. 5. This shows in a plan view a section of the substrate 7 looking down onto the surface 13. As can be seen, a multiplicity of individual surface sections 14 are formed, for example impressed, there, all having the shape of individual honeycomb cells. The cells can be arranged extremely tightly packed relative to one another, as graphically illustrated in FIG. 5.

The attitude of the plane of the respective surface section 14 relative to the horizontal in each surface section 14, in other words, therefore, the direction in which the respective needle 12 is aligned, is represented by a corresponding symbol.

In this embodiment, in the center of the detector, represented by the surface section 14a, as also in the small number of surface sections 14b arranged there around, the respective surfaces run horizontally, that is to say that the respective needles 12 stand vertically on the drawing plane.

As the distance from the center of the detector increases, see for example the surface sections 14c, the respective surface section tilts somewhat, causing the respective carried needle—each surface section 14 carries a single needle—to tilt outward somewhat, i.e., away from the center of the detector, where FIG. 5 shows a plan view onto the structured surface 13. The slight tilt is represented by the arrow indicated in each case.

As the distance increases, this tilt becomes more and more pronounced, as illustrated for example by the surface sections 14d shown at the edge and the arrows drawn there, which are significantly longer than the arrows of the surface sections lying further inward. The respective arrow length is indicative of the respective tilt angle of the respective surface and hence of the respective needle relative to the horizontal or drawing plane.

Because in some cases each surface section carries only one needle 12, given that its surface area essentially corresponds to the desired cross-sectional area of a needle 12 that is to be grown, which needle has an average thickness of 5-20 µm, a corresponding number of such surface sections 14 may be applied distributed over the surface 13, depending on the respective overall detector size.

Figure 6:
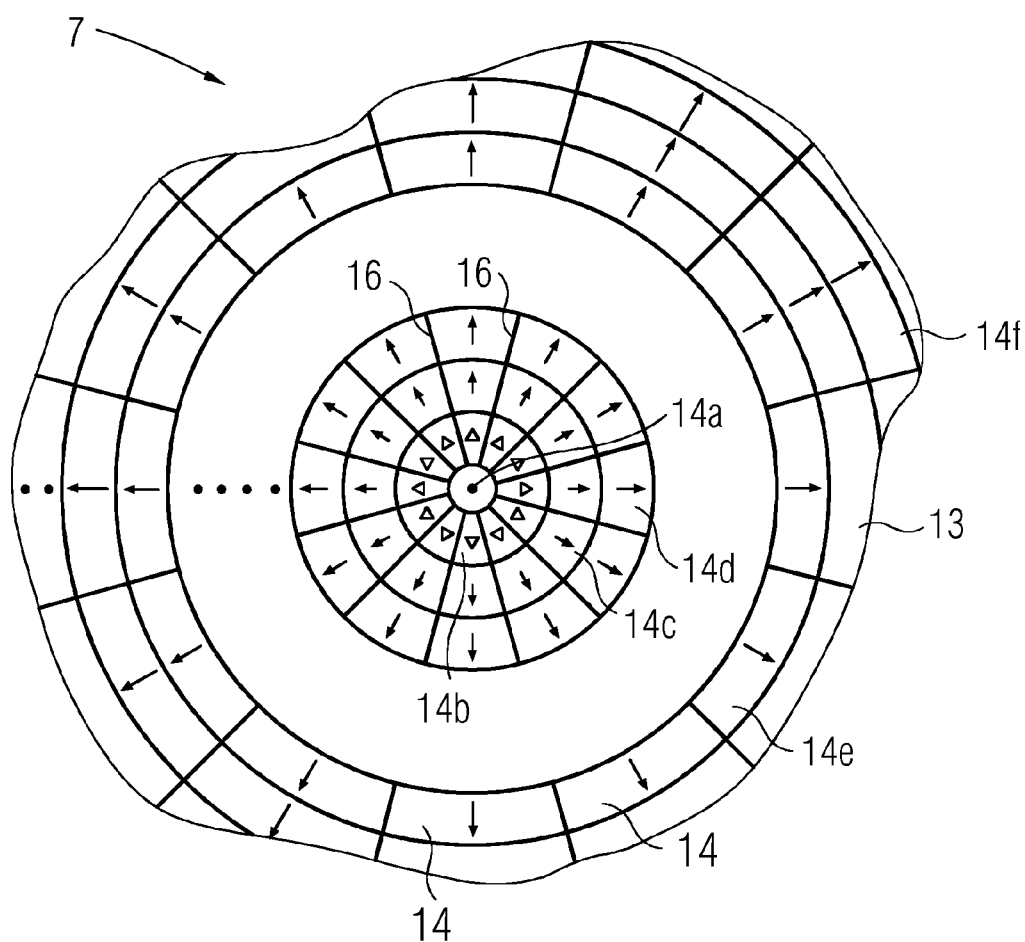
FIG. 6 shows a plan view onto the surface of a structured substrate of a second embodiment variant, according to certain embodiments.

As well as the honeycomb arrangement as shown in FIG. 5, a further embodiment possibility is shown in FIG. 6. There too, the substrate 7 is again depicted in a plan view looking down onto its surface 13. In this case the individual surface sections 14 are implemented in the form of individual tetragons which are arranged in concentric circles around the center of the detector. Each circle is therefore formed from a series of individual surface sections 14. A central surface section 14a is again located in the center. The circle or ring adjoining it is formed by way of a plurality of surface sections 14b which for example can have the same orientation as the surface section 14a. The concentric circle or ring adjoining it is formed by way of the surface sections 14c which can be tilted outward through a first angle, again represented by a small arrow. The surface sections 14d arranged in the next circle or ring can in turn be tilted somewhat further outward, as represented by the somewhat longer arrows shown, etc. The surface sections lying further and further toward the outside, such as the surface sections and in particular the surface sections 14f shown at the edge, are tilted further and further outward, with the result that the needles are also inclined correspondingly at an angle toward the outside.

In the exemplary embodiment shown, the individual surface sections 14 and 14a-14f are separated from one another by respective ridges 16. This means that each ring or each circle is interrupted by way of said ridges 16 in order to delimit the individual surface sections peripherally. Said ridges consequently define the respective size of a surface section 14 and thereby the size of a needle 12 deposited there. This structuring 15 too is formed for example by way of an extrusion or stamping process. Obviously, such ridges can also delimit the respective honeycomb cell of the structuring 15 shown in FIG. 5.

What is claimed is:

1. A flat-panel X-ray radiation detector, comprising:
a scintillator layer applied to a substrate and comprising elongated needles made from a scintillator material forming the scintillator layer, and
an actively readable pixel array comprising photodiodes,
wherein the thickness of the scintillator layer is in the range of 900 µm 2500 µm,
wherein each elongated needle forms an angle with respect to a plane of the pixel array,
wherein the respective angle for different needles decreases with increasing distance from a center of the detector,
wherein the substrate comprises a pre-formed non-planar surface on which the scintillator layer is formed, the pre-formed non-planar substrate surface defining a plurality of substrate surface sections forming a plurality of different angles with respect to the plane of the pixel array,
wherein each needle extends from one of the substrate surface sections, and
wherein the angle of each needle with respect to the plane of the pixel array is defined by the angle of the substrate surface section from which it extends.

2. The radiation detector of claim 1, wherein the thickness of the scintillator layer is in the range of 1000 µm-2000 µm.

3. The radiation detector of claim 1, wherein the substrate surface sections are in the shape of honeycombs, tetragons, polygons, or circles.

4. The radiation detector of claim 3, wherein tetragonal substrate surface sections are arranged on a circular path, wherein the substrate surface is structured with a plurality of concentric circular paths.

5. The radiation detector of claim 1, wherein adjacent substrate surface sections are separated from one another by ridges projecting in the direction of the needles.

6. The radiation detector of claim 1, wherein the size of a substrate surface section essentially corresponds to the cross-sectional area of a deposited needle.

7. The radiation detector of claim 1, wherein the substrate is a foil.

8. The radiation detector of claim 7, wherein the foil is an aluminum foil.

9. The radiation detector of claim 1, wherein the angle for a needle at the center of the detector is 90 degrees.

10. A structure for use in an X-ray radiation detector comprising:
a substrate comprises a pre-formed non-planar surface defining a plurality of substrate surface sections forming a plurality of different predefined angles with respect to a reference plane,
an array of elongated needles made from a scintillator material and formed on the substrate, wherein each needle extends from one of the substrate surface sections
wherein the thickness of the scintillator layer is in the range of 900 µm-2500 µm, and
wherein the angle at which the needles stand relative to the reference plane, starting from 90° in the center of the detector, decreases with increasing distance from the center of the detector,
wherein the angle of each needle with respect to the reference plane is defined by the predefined angle of the substrate surface section from which it extends.

11. The structure of claim 10, wherein the thickness of the scintillator layer is in the range of 1000 µm-2000 µm.

12. The structure of claim 10, wherein the substrate surface sections are in the shape of honeycombs, tetragons, polygons, or circles.

13. The structure of claim 12, wherein tetragonal substrate surface sections are arranged on a circular path, wherein the substrate surface is structured with a plurality of concentric circular paths.

14. The structure of claim 10, wherein adjacent substrate surface sections are separated from one another by way of ridges projecting in the direction of the needles.

15. The structure of claim 10, wherein the size of a substrate surface section essentially corresponds to the cross-sectional area of a deposited needle.

* * * * *